(12) United States Patent
Battey et al.

(10) Patent No.: US 6,466,725 B2
(45) Date of Patent: Oct. 15, 2002

(54) APPARATUS AND METHOD FOR SPLITTING OPTICAL FIBERS

(75) Inventors: Jennifer A. Battey, Euless, TX (US); Michael W. Canning, Dallas, TX (US); James M. Carlson, Ft. Worth, TX (US); Steve A. Fontaine, Ft. Worth, TX (US); Christopher L. Holderness, Pflugerville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 1 day.

(21) Appl. No.: 09/725,521

(22) Filed: Nov. 29, 2000

(65) Prior Publication Data

US 2002/0064364 A1 May 30, 2002

(51) Int. Cl.[7] .................................................. G02B 6/00
(52) U.S. Cl. ...................................... 385/135; 385/100
(58) Field of Search ................................ 385/134–137, 385/147, 100

(56) References Cited

U.S. PATENT DOCUMENTS

| | | | | |
|---|---|---|---|---|
| 5,125,060 A | * | 6/1992 | Edmundson | 385/100 |
| 6,304,698 B1 | * | 10/2001 | Morris | 385/100 |
| 6,314,229 B1 | * | 11/2001 | Sasaki et al. | 385/135 |

* cited by examiner

Primary Examiner—Akm E. Ullah
Assistant Examiner—Jerry T. Rahll
(74) Attorney, Agent, or Firm—Christopher C. Dreman

(57) ABSTRACT

An apparatus and method for splitting or otherwise separating and routing optical fibers are provided in which a splitter housing having first and second separable halves is mounted upon a plurality of optical fibers without having to cut all of the optical fibers. The splitter housing generally includes an inline portion and a branch portion. The inline portion defines an input port at one end for receiving a plurality of optical fibers and a primary output port at the opposed end through which at least one optical fiber exits. The branch portion extends outwardly from the inline portion at one end and defines a secondary output port at the opposed end. The branch portion is in communication with the inline portion such that at least one optical fiber that enters through the input port can be separated from the remainder of the optical fibers and routed through the branch portion.

18 Claims, 4 Drawing Sheets

APPARATUS AND METHOD FOR SPLITTING OPTICAL FIBERS

FIELD OF THE INVENTION

The present invention relates to the splitting or other separation of optical fibers and, more particularly, to an apparatus and method for splitting or otherwise separating optical fibers.

BACKGROUND OF THE INVENTION

Optical fibers must frequently be separated, branched, or otherwise redirected since not all optical fibers of a fiber optic cable will terminate at the same location. For example, a fiber optic cable may include optical fibers that must be directed to a plurality of different homes, businesses, offices or the like. Oftentimes, splice closures, patch closures and other types of closures are utilized to facilitate the splitting and redirection of one or more optical fibers from a fiber optic cable, while also serving to protect the optical fibers from environmental degradation and from mechanical stress and strain.

In a typical closure, a number of the optical fibers extend through the closure without being cut and spliced or otherwise connected. These optical fibers are generally termed express fibers. One or more of the optical fibers are separated from the express fibers, however, cut and redirected to a splice tray, a coupler tray, a connector panel or the like. The optical fibers that have been separated from the express fibers can then be spliced, coupled or otherwise connected to other optical fibers to be directed to a different location than the express fibers. In one common example in which a fiber optic feeder cable is received within a closure, a plurality of optical fibers are separated from the express fibers of the fiber optic feeder cable and are spliced to a corresponding plurality of optical fibers of fiber optic drop cables that extend from the closure to a home, a business or the like.

Even within a closure, however, care must be taken to separate the optical fibers from the express fibers without damaging the optical fibers. For example, if the optical fibers that are separated from the express fibers are bent too sharply, the optical fibers can be broken or otherwise physically damaged, such as by creating microfractures, whereby the optical fibers no longer properly transmit optical signals.

Moreover, in the common situation in which a plurality of optical fibers are to be separated from a fiber optic feeder cable in a taut sheath application, a section of the sheath is removed to expose the buffer tube(s) or, in some instances, the optical fibers themselves. In instances in which the optical fibers to be separated are disposed within a buffer tube, the buffer tube is also removed to thereby expose the optical fibers. The optical fibers to be separated are then cut and redirected to a splice tray, a coupler tray, a connector panel or the like. Due to the removal of the sheath and, in some instances the buffer tube(s) of the fiber optic feeder cable, the optical fibers to be separated are exposed for only a relatively limited length, generally about 18 to 24 inches in a typical closure. Thus, the optical fibers to be separated from the express fibers of the fiber optic feeder cable must be routed to the splice tray, coupler tray, connector panel or the like in a relatively direct manner, while still taking care not to excessively bend or otherwise damage the optical fibers.

While bare optical fibers are commonly separated and routed within a closure, spiral wrap tubing can be wrapped about the optical fibers to protect the optical fibers from excessive bending or other physical damage. As will be apparent, however, the wrapping of spiral wrap tubing about the optical fibers requires a field technician to expend additional time during the configuration of the closure. The optical fibers that are separated from the express optical fibers can also be disposed within transport tubes that serve at least partially to protect the optical fibers from being bent excessively or otherwise physically damaged. Unfortunately, neither the spiral wrap tubing nor the transport tubes completely protect the optical fibers from excessive bending or other types of physical damage, especially at the transition point at which the optical fibers are split or otherwise separated.

A funnel kit has been developed by Raychem Corporation for splitting optical fibers and for protecting the optical fibers at the point of separation. The funnel kit defines an input port and an opposed output port. The funnel tapers radially outwardly in a direction from the input port to the output port such that the output port is substantially larger in diameter than the input port. Moreover, the funnel kit includes an insert that is disposed within the output port and that defines a plurality of passageways therethrough. As such, the funnel kit can be mounted upon a plurality of optical fibers, such as the optical fibers of a fiber optic feeder cable, and the optical fibers can be slit or otherwise separated into different groups that extend through respective passageways defined by the insert. For example, express fibers can extend through a passageway that is coaxial with the longitudinal axis of the funnel, while the optical fibers that are to be separated from the express fibers can be directed to other passageways. Transport tubes can also be inserted into the passageways to protect the optical fibers upon their exit from the funnel kit. While effective for protecting the optical fibers at their point of separation, the funnel kit requires that each of the optical fibers, including the express fibers, be cut before being inserted through the funnel. As will be apparent, the cutting and subsequent splicing of each of the optical fibers will increase the time required for a field technician to properly route the optical fibers and furthermore may somewhat attenuate the optical signals propagating along the optical fibers.

Thus, it would be desirable to develop improved techniques for splitting or otherwise separating and routing optical fibers in a manner that protects the optical fibers from being bent excessively and from other physical damage. In addition, it would be desirable for methods to be developed for splitting or otherwise separating and routing optical fibers that do not require each of the optical fibers, especially the express fibers, to be cut, thereby reducing the time required for a field technician to configure a closure.

SUMMARY OF THE INVENTION

An apparatus and method for splitting or otherwise separating and routing optical fibers are therefore provided in which a splitter housing is mounted upon a plurality of optical fibers without having to cut all of the optical fibers, and in particular, without having the cut the express fibers. The splitter housing is adapted to be readily mounted upon the optical fibers such that the time required for a field technician to configure a closure utilizing the apparatus and method of the present invention is advantageously reduced. Moreover, the apparatus and method of the present invention protects the optical fibers at the point of splitting or otherwise separating such that the optical fibers are not bent excessively and are protected from other physical damage.

According to one embodiment, an apparatus for splitting optical fibers is provided that includes splitter housing extending lengthwise between opposed first and second ends. The splitter housing defines an input port, proximate the first end, for receiving a plurality of optical fibers. The splitter housing also defines primary and secondary output ports, proximate the opposed second end, through which the plurality of optical fibers exit the splitter housing.

The splitter housing includes first and second halves. Each half of the splitter housing extends lengthwise between the opposed first and second ends. Each half of the splitter housing defines at least a portion of the input port and at least one and, more typically, both of the output ports. The first and second halves of the splitter housing of this embodiment are preferably at least partially separable. As such, the splitter housing can be mounted upon the plurality of optical fibers without having to cut all of the optical fibers. In particular, the splitter housing can be installed around the optical fibers without having to cut the express fibers, thereby simplifying the installation process and reducing the time required by a field technician to configure the closure.

The apparatus for splitting optical fibers may also include a separation element disposed within the splitter housing proximate the secondary output port. The separation element defines a plurality of channels. The optical fibers that exit the secondary output port are directed through respective channels of the separation element to separate the optical fibers. Each channel defined by the separation element extends in a lengthwise direction and defines a lateral cross-sectional area that increases in a direction towards the secondary output port. The apparatus for splitting optical fibers can further include a plurality of transport tubes that are partially inserted into respective channels defined by the separation element. As a result of the tapered shape of each channel, the transport tubes can be engaged within respective channels defined by the separation element.

The apparatus for splitting optical fibers may also include an adapter element disposed within the splitter housing proximate the input port for facilitating mounting the splitter housing upon different types of fiber optic cables. Further, the apparatus for splitting optical fibers may include a fiber retainer disposed within the splitter housing proximate the secondary output port for engaging at least some of the optical fibers that exit through the secondary output port. The fiber retainer can therefore retain those optical fibers within the splitter housing while the first and second halves of the splitter housing are closed, thereby preventing the optical fibers from being crushed between the first and second halves of the splitter housing. Each half of the splitter housing may also include corresponding latches such that the first and second halves of the splitter housing are secured together in the closed position.

According to another aspect to the present invention, the apparatus for splitting optical fibers includes an inline portion and a branch portion. The inline portion defines the input port at one end for receiving the plurality of optical fibers and the primary output port at the opposed end through which at least one optical fiber exits. The inline portion is configured such that the input port and the primary output port are coaxial. In the typical embodiment in which the express fibers extend through the inline portion, the express fibers therefore need not be bent. On the other hand, the branch portion extends outwardly from the inline portion adjacent one end to the secondary output port at the opposed end. The branch portion is in communication with the inline portion such that at least one optical fiber that enters through the input port can be split or otherwise separated from the remainder of the optical fibers and routed through the branch portion. To prevent the optical fibers that are routed through the branch portion from being bent excessively, the branch portion defines an acute angle, such as between about 20° and 40° and, more preferably, about 30°, with respect to the inline portion proximate the primary output port. The branch portion is also typically smaller in lateral cross-sectional area than the inline portion. In one embodiment, the branch portion includes a first segment proximate the inline portion that extends outwardly from the inline portion and that defines the acute angle with respect to the inline portion proximate the primary output port. Additionally, the branch portion of this embodiment includes a second segment connected to the first segment that extends parallel to the inline portion. The apparatus for splitting optical fibers of this aspect of the present invention can therefore separate one or more optical fibers from a plurality of optical fibers, while protecting the optical fibers that are being separated from being bent excessively or from being otherwise physically damaged.

According to another aspect of the present invention, a method is provided for splitting a plurality of optical fibers. According to this method, the splitter housing is separated in the first and second halves. A plurality of optical fibers are then routed through the opened splitter housing such that at least one optical fiber extends from the input port to the primary output port while another optical fiber extends from the input port to the secondary output port. The first and second halves of the splitter housing are then closed together to retain the plurality of optical fibers therein. Once closed, the first and second halves of the splitter housing are latched together in the closed position.

The plurality of optical fibers that exit through the secondary output port can also be split or otherwise separated. The separated optical fibers can then be directed through respective transport tubes that serve to further protect the optical fibers against physical damage. In embodiments in which an adapter element is disposed within the splitter housing proximate the input port, at least a portion of the fiber optic cable that provides the plurality of optical fibers can be secured to the adapter element. Thus, the splitter housing is capable of being mounted upon different types of fiber optic cables. Prior to closing the splitter housing, at least some of the optical fibers that exit through the secondary output port can also be engaged. As such, those optical fibers are retained within the splitter housing while the first and second halves of the splitter housing are being closed to prevent the optical fibers from being crushed between the first and second halves of the splitter housing.

The apparatus and method for splitting optical fibers according to the present invention therefore permit optical fibers to be selectively separated in a manner that protects the optical fibers by preventing the optical fibers from being excessively bent or from otherwise being physically damaged. In addition, the apparatus and method for splitting optical fibers according to the present invention can redirect the optical fibers without requiring all of the optical fibers to be cut. In particular, the express fibers can extend uninterrupted through the splitter housing without being cut. Moreover, the apparatus and method for splitting optical fibers according to the present invention can be utilized in conjunction with a wide variety of different types of fiber optic cables.

BRIEF DESCRIPTION OF THE DRAWINGS

Figure 1:
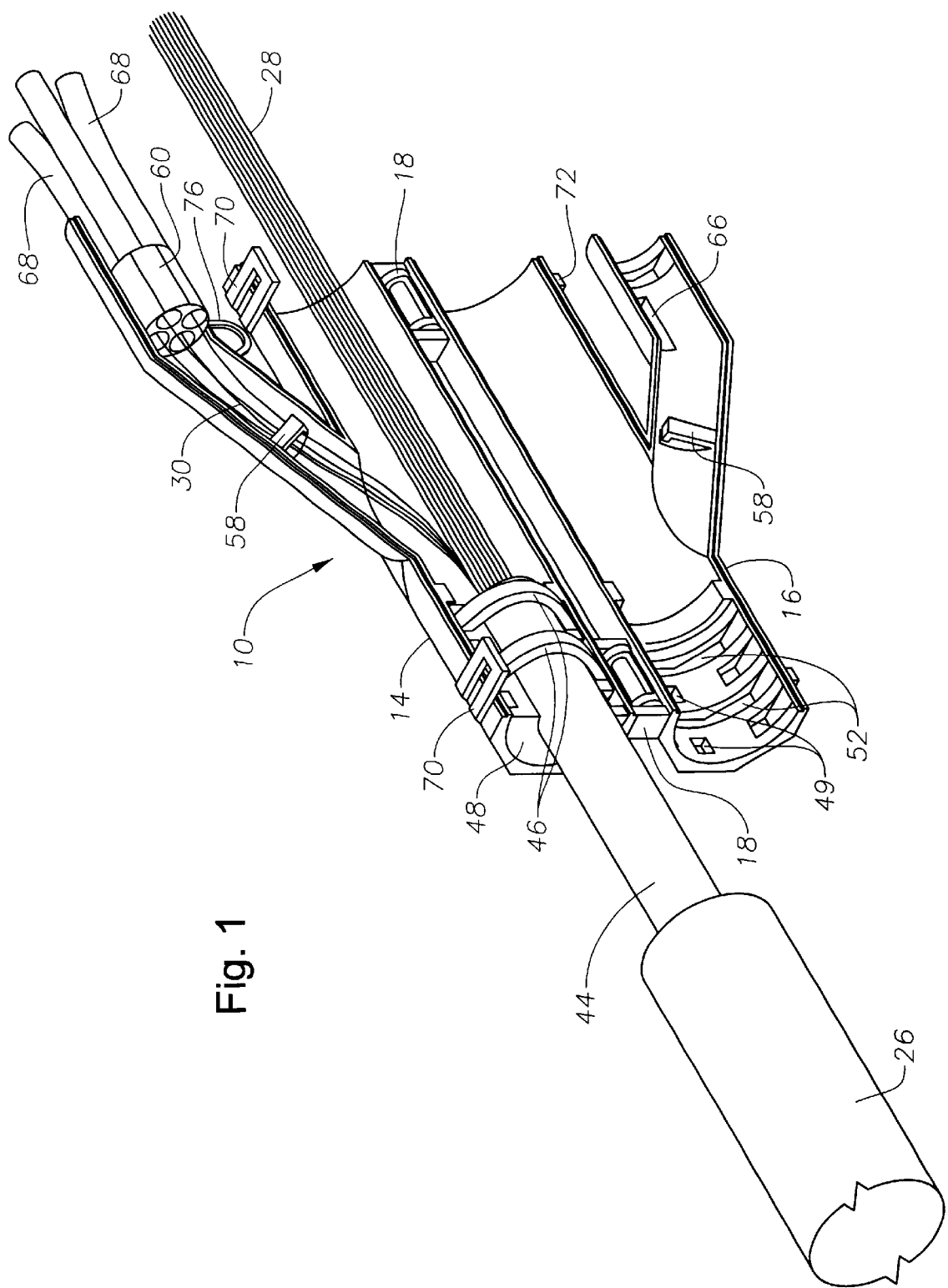
Figure 2:
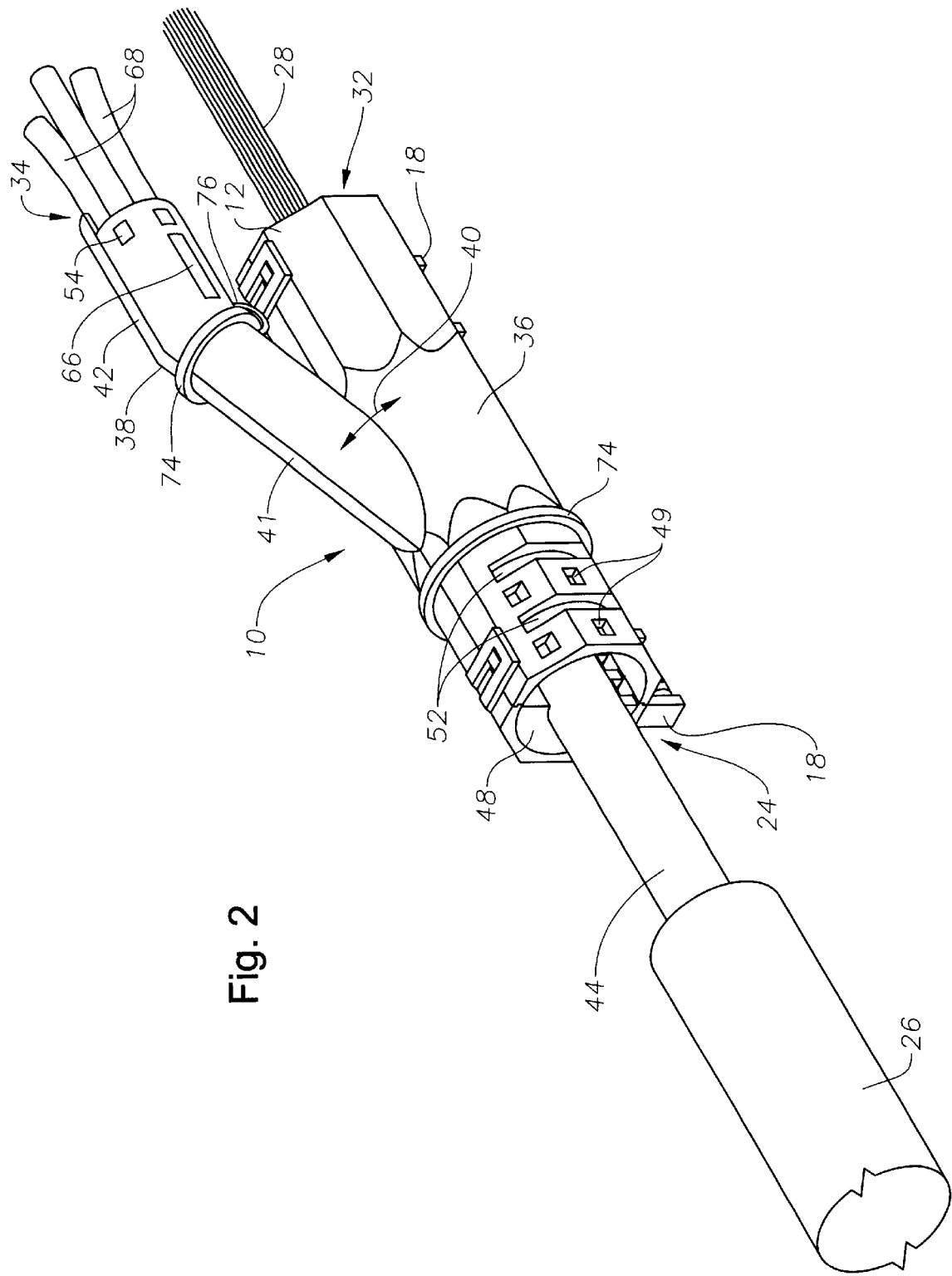
Figure 3B:
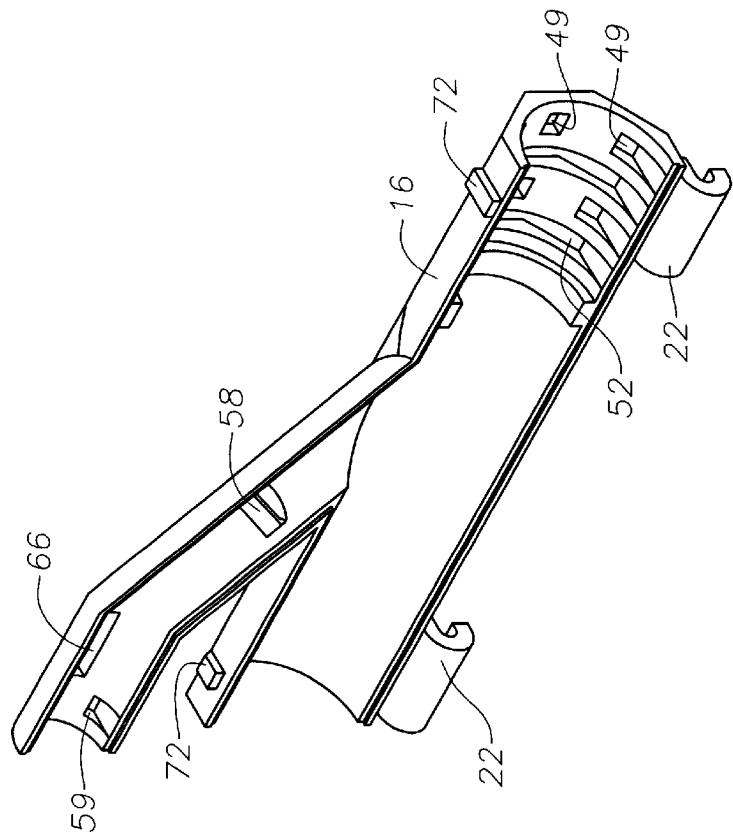
Figure 3A:
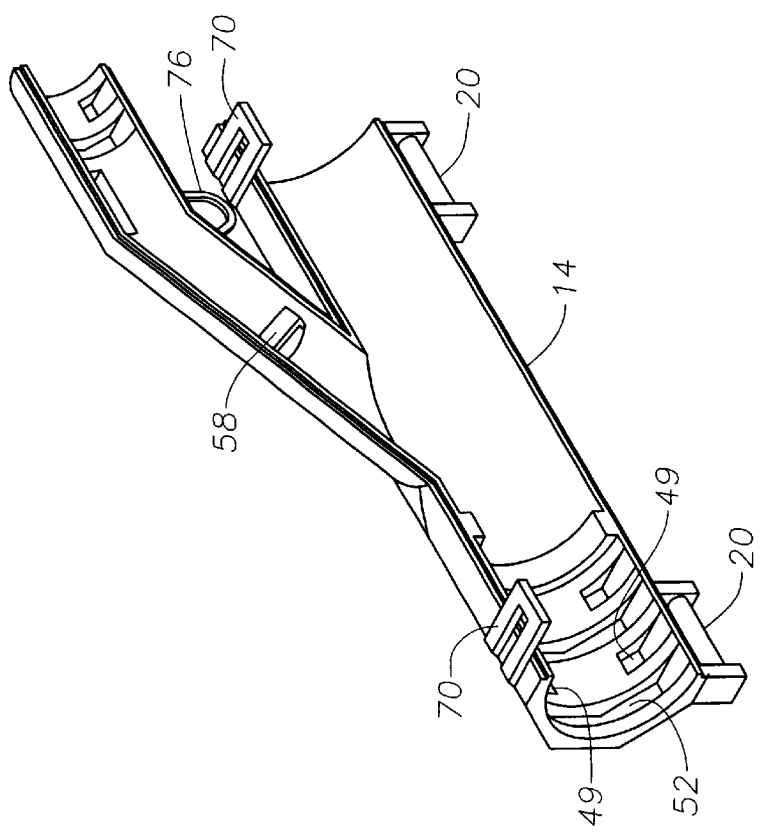
Figure 4:
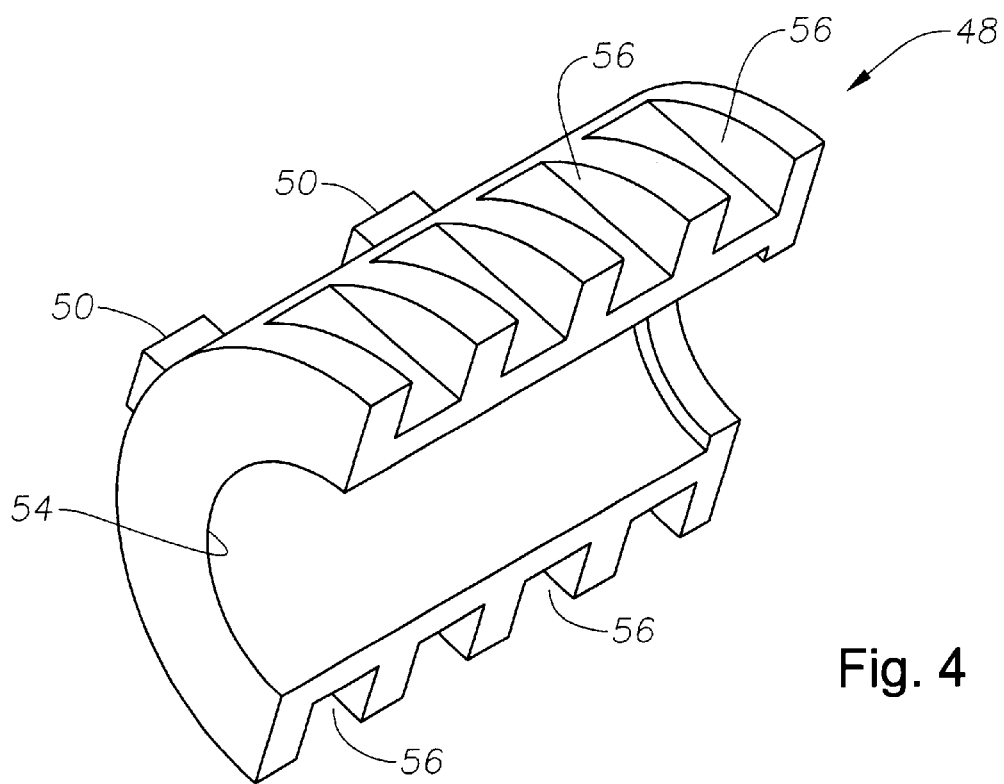
Figure 5:
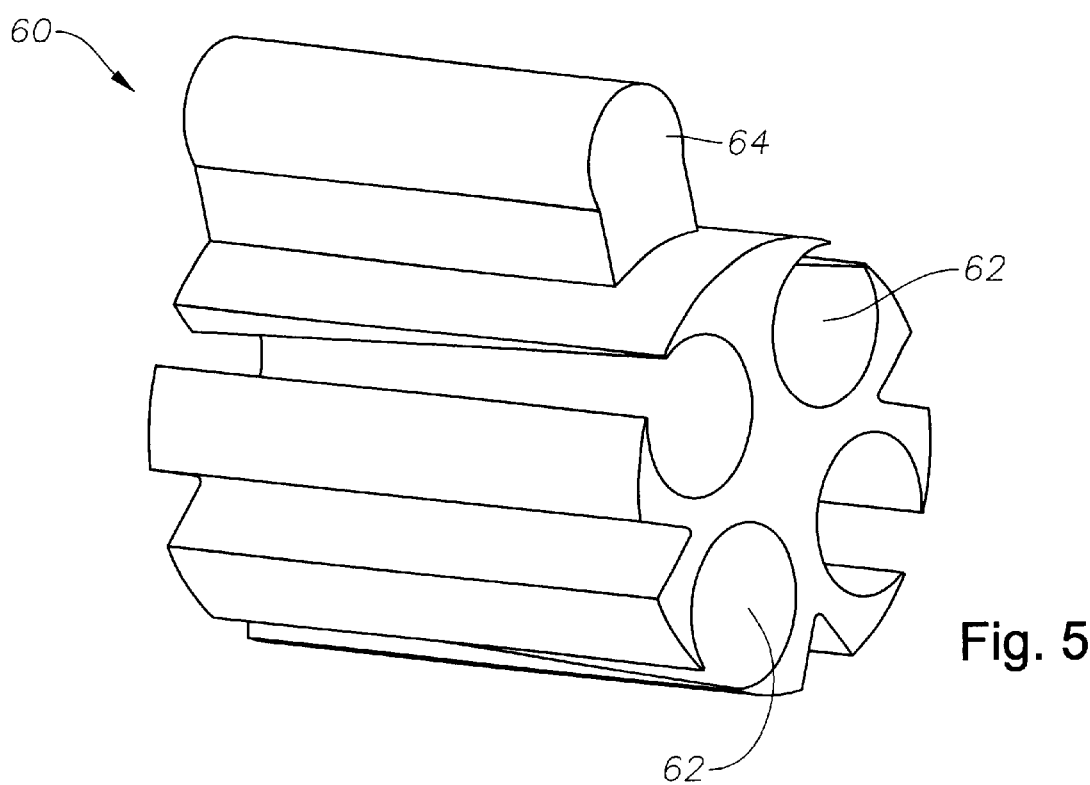

Having thus described the invention in general terms, reference will now be made to the accompanying drawings, which are not necessarily drawn to scale, and wherein:

FIG. 1 is a perspective view of an apparatus for splitting optical fibers according to one embodiment of the present invention in which the first and second halves of the splitter housing are separated to more clearly illustrate the routing of the optical fibers through the splitter housing;

FIG. 2 is a perspective view of the apparatus for splitting optical fibers of FIG. 1 in which the first and second halves of the splitter housing are closed and latched;

FIGS. 3a and 3b are perspective views of the first and second halves of the splitter housing, respectively, according to one embodiment of the present invention;

FIG. 4 is a perspective view of an adapter element for facilitating mounting of the splitter housing upon different types of fiber optic cables according to one embodiment of the present invention; and FIG. 5 is a perspective view of a separation element for separating the optical fibers that exit the secondary output port of the splitter housing according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that the disclosure will be thorough and complete, and will fully convey the intended scope of the invention to those skilled in the art. Like reference numerals refer to like elements throughout.

Referring now to FIGS. 1 and 2, an apparatus 10 for splitting optical fibers is depicted. Typically, the apparatus 10 is disposed within a closure such that at least some of the optical fibers that enter the closure can be appropriately split or otherwise separated from the remainder of the optical fibers and routed or otherwise redirected to a splice tray, a coupler tray, a connector panel or the like. However, the apparatus 10 of the present invention can be utilized in a variety of other applications in which it is desirable to split and redirect the optical fibers in a manner that protects the optical fibers from being excessively bent and from otherwise being physically damaged. Moreover, the apparatus 10 of the present invention can effectively split and redirect the optical fibers without having to cut all of the optical fibers, and in particular, the express fibers.

The apparatus 10 for splitting optical fibers includes a splitter housing 12 that extends lengthwise between opposed first and second ends. The splitter housing 12 preferably includes first and second halves 14, 16, each of which also extends lengthwise between the opposed first and second ends. The splitter housing 12 is typically formed of a durable plastic, a resin or a reinforced plastic. However, the splitter housing 12 can be formed of a metallic material, such as steel, or from some other material, if so desired.

The first and second halves 14, 16 of the splitter housing 12 are preferably at least partially separable. As depicted in FIGS. 1 and 2, for example, the first and second halves 14, 16 of the splitter housing may be hingedly connected such that the first and second halves 14, 16 can be separated to access the interior of the splitter housing 12, thereby facilitating the routing of optical fibers through the splitter housing 12. In this regard, the first and second halves 14, 16 of the splitter housing 12 may include two or more hinges 18. As shown in FIGS. 3a and 3b, each hinge 18 generally includes complementary hinge elements 20, 22 carried by the first and second halves 14, 16 of the splitter housing 12, respectively. However, the first and second halves 14, 16 of the splitter housing 12 need not be hingedly connected and, instead, may be connected in any other suitable manner and/or may be capable of being completely separated, if so desired. As will be apparent from the following description, the separation of the first and second halves 14, 16 of the splitter housing 12 permits the splitter housing 12 to be mounted upon a plurality of optical fibers without having to cut all of the optical fibers. In this regard, the splitter housing 12 can be mounted upon a plurality of optical fibers provided by a fiber optic feeder cable without having to cut the express fibers that extend uncut, unspliced or otherwise uninterrupted through the housing 12.

The splitter housing 12 defines an input port 24, proximate the first end. The input port 24 is adapted to receive a plurality of optical fibers. In one common example depicted in FIGS. 1 and 2, the splitter housing 12 is mounted upon a fiber optic feeder cable 26 such that the input port 24 receives both the express fibers 28 and the optical fibers 30 that are to be split or otherwise separated from the express fibers 28. The splitter housing 12 also defines primary and secondary output ports 32, 34 proximate the opposed second end. The plurality of optical fibers that enter the splitter housing 12 through the input port 24 exit through either the primary output port 32 or the secondary output port 34. In the embodiment of FIGS. 1 and 2 in which the splitter housing 12 is mounted upon a fiber optic feeder cable 26, the express fibers 28 typically exit through the primary output port 32, while the optical fibers 30 that are split or otherwise separated from the express fibers 28 exit through the secondary output port 34. However, the optical fibers can be routed differently through the splitter housing 12 so as to exit through different ones of the output ports depending upon the particular application. As illustrated, each half 14, 16 of the splitter housing 12 typically defines at least a portion of the input port 24 and portions of both the primary and secondary output ports 32, 34 such that optical fibers can be readily routed through each port while the first and second halves 14, 16 of the splitter housing 12 are separated.

The splitter housing 12 preferably includes an inline portion 36 that defines the input port 24 at one end and the primary output port 32 at the opposed end. In this advantageous embodiment, the input port 24 and the primary output port 32 are coaxial such that optical fibers can extend through the inline portion 36 without being bent, twisted or otherwise disturbed. Additionally, the splitter housing 12 preferably includes a branch portion 38 that extends outwardly from the inline portion 36 at one end and that defines the secondary output port 34 at the opposed end. The branch portion 38 is in communication with the inline portion 36 such that at least one of the optical fibers entering through the input port 24 can be split from the remainder of the optical fibers and routed through the branch portion 38. In the embodiment depicted in FIG. 1 in which the splitter housing 12 is mounted upon the fiber optic feeder cable, the express fibers 28 extend through the inline portion 36 while the optical fibers 30 that are to be separated from the express fibers 28 and spliced to corresponding optical fibers of one or more drop cables extend through the branch portion 38.

To avoid excessively bending the optical fibers 30 and thereby damaging the fibers or attenuating the signals propagating through the fibers, the branch portion 38 defines an acute angle 40 with respect to the inline portion 36 proximate the primary output port 32. Preferably, the branch portion 38 defines an acute angle 40 between 20° and 40° with respect to the inline portion 36 proximate the primary output port 32. More preferably, the branch portion 38 defines an acute angle 40 of about 30° with respect to the inline portion 36 proximate the primary output port 32.

The branch portion 38 is typically smaller in lateral cross-sectional area than the inline portion 36 since the inline portion 36 typically contains a greater number of optical fibers than the branch portion 38. For example, the splitter housing 12 of one embodiment has an inline portion 36 that has a lateral cross-sectional area that is two to five times greater than that of the branch portion 38. However, the inline portion 36 and the branch portion 38 may have approximately equal lateral cross-sectional areas or, alternatively, the branch portion 38 could be larger in lateral cross-sectional area than the inline portion 36, depending upon the particular application. As illustrated, the inline portion 36 and the branch portion 38 may each have a cylindrical shape. However, the inline portion 36 and the branch portion 38 may have other shapes and may also be shaped differently from one another, if so desired.

The branch portion 38 of one embodiment includes first and second segments 41, 42. The first segment 41 is proximate to and extends outwardly from the inline portion 36, thereby defining the acute angle 40 with respect to the inline portion 36. The second segment 42 is connected to the first segment 41 and extends parallel to the inline portion 36. As such, the optical fibers that exit the secondary output port 34 defined by the second segment 42 of the branch portion 38 will be directed in the same general direction as the optical fibers that exit the primary output port 32 defined by the inline portion 36.

To route the optical fibers through the splitter housing 12, the first and second halves 14, 16 of the splitter housing 12 are separated, or opened, as shown in FIG. 1. The optical fibers are then routed through one half 14, 16 of the splitter housing 12 and, once the routing of the optical fibers is complete, the first and second halves 14, 16 of the splitter housing 12 are closed to retain the optical fibers therein, as depicted in FIG. 2. While the splitter housing 12 is separated, however, the optical fibers can initially be routed through either the first half 14 or the second half 16 of the splitter housing 12 depending upon the particular application. For example, in a typical installation in which the splitter housing 12 is disposed within a closure, one half 14, 16 of the splitter housing 12 is initially mounted within the closure, such as by one or more bolts, screws or other fasteners that extend through corresponding apertures defined by the splitter housing 12 and engage the housing of the closure. As such, the half 14, 16 of the splitter housing 12 through which the optical fibers will be routed is determined by the orientation of the splitter housing 12 with respect to the closure as well as the end of the closure through which the optical fibers enter. While the splitter housing 12 is typically disposed within a closure, the splitter housing 12 need not always be disposed within a closure, but, instead, may be mounted within a cabinet or any other type of enclosure or upon a wall, a pole or the like, typically by means of one or more bolts, screws or other fasteners that extend through the corresponding apertures defined by the splitter housing 12.

To route the optical fibers through the splitter housing 12, the plurality of optical fibers are initially extended through the input port 24 defined by the splitter housing 12. While the splitter housing 12 may be mounted upon a variety of different types of fiber optic cables, one common application involves the mounting of the splitter housing 12 upon a fiber optic feeder cable 26 that includes a central buffer tube 44 through which a plurality of fiber optic ribbons extend. As such, this embodiment will be described in more detail with reference to FIGS. 1 and 2, but merely for purposes of example and not of limitation. In this embodiment, the sheath and the strength members are removed from a segment of the fiber optic feeder cable 26, thereby exposing the central buffer tube 44. At some point beyond the point at which the sheath terminates, the buffer tube 44 is also removed to thereby expose the fiber optic ribbons. Thus, in this embodiment, the buffer tube 44 extends outwardly beyond the sheath and the strength members and the fiber optic ribbons extend outwardly beyond the buffer tube 44.

The splitter housing 12 is mounted upon the fiber optic feeder cable 26 in this exemplary application such that a portion of the fiber optic feeder cable 26 having an exposed buffer tube 44 extends through the input port 24 defined by the splitter housing 12. The splitter housing 12 is also positioned with respect to the fiber optic feeder cable 26 such that the buffer tube 44 terminates at some point between the input port 24 and the point at which the branch portion 38 joins the inline portion 36. The fiber optic feeder cable 26 and, in particular, the buffer tube 44 is preferably secured to the splitter housing 12, such as by means of tie-wraps or other fasteners 46 that extend through corresponding apertures 49 defined by the inline portion 36 of the splitter housing 12 proximate the input port 24 and that encircle the buffer tube 44. See FIGS. 1, 3a and 3b. Slots 52 provide clearance for the tie wraps or other fasteners 46 when the first half 14 and the second half 16 are closed and latched together. Although not necessary for the practice of the present invention, the portion of the buffer tube 44 engaged by the tie wraps or other fasteners 46 may be coated or may otherwise include an element to increase the frictional engagement between the buffer tube 44 and the tie wraps or other fasteners 46. For example, the portion of the buffer tube 44 engaged by the tie wraps or other fasteners 46 of one embodiment is wrapped with tape, such as electrical tape or the like, to increase the fractional engagement therewith.

The splitter housing 12 is preferably designed to receive and be securely mounted upon the end portions of a variety of fiber optic cables or fiber optic cable components, such as the central buffer tube 44 of the fiber optic feeder cable 26 described above. In instances in which the fiber optic cable or the fiber optic cable component upon which the splitter housing 12 is to be mounted is relatively large, the splitter housing 12 can be mounted directly to the fiber optic cable or the fiber optic cable component. If, however, the fiber optic cable or the fiber optic cable component is smaller, the apparatus 10 for splitting optical fibers can include a cable adapter 48.

As shown in FIG. 4, a cable adapter 48 is typically a lengthwise extending arcuate member. The cable adapter 48 is designed to be mounted within the inline portion 36 of the splitter housing 12 proximate the input port 24 to more snugly receive the fiber optic cable or fiber optic cable component upon which the splitter housing 12 is to be mounted. As shown in FIG. 4, the exterior surface of the cable adapter 48 preferably comprises at least one and, more typically, a pair of outwardly projecting keys 50 that engage corresponding slots or keyways 52 defined by the inline portion 36 of the splitter housing 12 proximate the input port 24, thereby securely positioning the cable adapter 48 within the splitter housing 12. As shown in FIGS. 3a and 3b, for example, the slots 52 defined by the inline portion of the splitter housing 12 typically extend at least partially circumferentially thereabout. Once the cable adapter 48 is positioned within the inline portion 36 proximate the input port 24, the fiber optic cable or fiber optic cable component is mounted therein. In this regard, the inner surface 54 of the cable adapter 48 preferably defines a lengthwise extending channel having a semi-circular shape in lateral cross-section that is sized to closely approximate the size of the fiber optic cable or fiber optic cable component upon which the splitter housing 12 is to be mounted. In the embodiment in which the splitter housing 12 is mounted upon the central buffer tube 44 of a fiber optic feeder cable 26, the cable adapter 48 preferably defines a semicircular lengthwise extending channel having a diameter that equals or slightly exceeds the diameter of the central buffer tube 44, such that the central buffer tube 44 can be snugly received therein. The fiber optic cable or fiber optic cable component and the cable adapter 48 are then secured to the splitter housing 12 by means of one of more tie wraps or other fasteners 46 that typically extend through corresponding apertures 49 defined by the inline portion 36 of the splitter housing 12 proximate the input port 24 and that encircle both the cable adapter 48 and the fiber optic cable or the fiber optic cable component upon which the splitter housing 12 is mounted. In this regard, the exterior surface of the cable adapter 48 may define one or more slots 56 through which the tie wraps or other fasteners 46 can extend. While the slots 56 can extend about the entire exterior surface of the cable adapter 48, the slots 56 need only extend from the opposed edges of one cable adapter 48 to a location proximate the apertures 49 defined by the inline portion 36 of the splitter housing 12.

In addition to securing the splitter housing 12 to the fiber optic cable or fiber optic cable component by means of tie wraps or other fasteners 46, the splitter housing 12 can include various internal and/or external features for engaging the fiber optic cable or fiber optic cable component. For example, the splitter housing 12 can include stepped interior edges, serrated or staggered edges, dimples and/or cleats disposed on the interior surface of the splitter housing 12 proximate the input port 24 for engaging the sheath or buffer tube of a fiber optic cable.

As a result of the termination of the buffer tube 44 within the splitter housing 12 and, more particularly, within the inline portion 36 of the splitter housing 12 proximate the input port 24, the optical fibers are exposed. Although the splitter housing 12 is equally capable of routing individual optical fibers, the embodiment depicted in FIG. 1 and described hereinafter includes a splitter housing 12 mounted upon a fiber optic feeder cable 26 that includes a plurality of fiber optic ribbons. As such, the fiber optic ribbons are selectively routed through either the branch portion 38 or the remainder of the inline portion 36 to exit through either the primary or secondary output port 32, 34. While one or more ribbons can be routed through the branch portion 38 of the splitter housing 12, one or more optical fibers 30 of a fiber optic ribbon can be split from the other optical fibers of the respective fiber optic ribbon and routed through the branch portion 38 if less than all of the optical fibers of the fiber optic ribbon are to be separated from the express fibers 28. As such, in the illustrated embodiment, four of the optical fibers of a fiber optic ribbon are split from the remainder of the optical fibers of the fiber optic ribbon, as well as from the other fiber optic ribbons, and directed through the branch portion 38. As such, these four optical fibers 30 will exit the splitter housing 12 through the secondary output port 34, while the other optical fibers 28 will exit through the primary output port 32. In one embodiment, the four optical fibers 30 that exit through the secondary output port 34 are subsequently spliced to corresponding optical fibers of one or more fiber optic drop cables, while the other optical fibers 28 that extend through the inline portion 36 and exit through the primary output port 32 are express fibers. However, the optical fibers that exit through the primary and secondary output ports 32, 34 can be routed and connected in a variety of other manners following their exit from the splitter housing 12 without departing from the spirit and scope of the present invention.

To retain the optical fibers 30 within the branch portion 38 prior to closing the first and second halves 14, 16 of the splitter housing 12, the branch portion 38 of the splitter housing 12 preferably comprises a fiber retainer 58, such as a clip. The fiber retainer 58 engages the optical fibers 30 extending through the branch portion 38 and prevents those optical fibers 30 from being crushed or otherwise trapped between the first and second halves 14, 16 of the splitter housing 12 while the first and second halves 14, 16 of the splitter housing 12 are being closed. Although the fiber retainer 58 may have various designs, the fiber retainer 58 of one embodiment includes an L-shaped member having an upstanding portion and a foot portion. The foot portion extends towards a sidewall of the branch portion 38 and is spaced only slightly therefrom such that optical fibers can be inserted through the slight space defined between the foot portion of the fiber retainer 58 and the sidewall of the branch portion 38 with the optical fibers thereafter being supported by the foot portion of the fiber retainer 58. Although the optical fibers that extend through the branch portion 58 of a splitter housing 12 are typically retained by the fiber retainer 58 of one half of the splitter housing 12, both halves 14, 16 of the splitter housing 12 preferably include a fiber retainer 58 as shown in FIGS. 3a and 3b such that the optical fibers can initially be routed through either half of the splitter housing 12 and can be retained therein to avoid crushing or otherwise damaging the optical fibers upon closing the first and second halves 14, 16 of the splitter housing 12.

In many instances, it is desirable that the optical fibers 30 that exit the secondary output port 34 be disposed within a transport tube or the like, to protect the optical fibers 30 from excessive bending or other physical damage following their exit from the splitter housing 12. As such, the secondary output port 34 defined by the branch portion 38 is preferably sized to receive a transport tube in which the optical fibers 30 that exit from the branch portion 38 will be disposed. To more securely engage the transport tube, a tie wrap or other fastener can extend through corresponding apertures 59 defined by the branch portion 38 proximate the secondary output port 34 to encircle the transport tube and draw it tightly against the sidewall of the branch portion 38. Likewise, the inline portion 36 proximate the primary output port 32 can define a plurality of apertures 61 for receiving a tie wrap or other fastener in instances in which it is desirable to secure one or more of the optical fibers or the fiber optic ribbons to the sidewall of the inline portion 36.

In some embodiments, it is desirable that the optical fibers 30 that exit through the secondary output port 34 of the branch portion 38 be directed in different directions. Thus, the apparatus 10 for splitting optical fibers according to one embodiment includes a separation element 60 that is disposed within the branch portion 38 proximate the secondary output port 34 for separating the optical fibers 30. The separation element 60 defines a plurality of lengthwise extending channels 62 through which respective optical fibers 30 are directed. In the embodiment illustrated in FIG. 5, for example, the separation element defines four lengthwise extending channels 62, each of which receives a respective optical fiber 30. However, the separation element 60 can define a greater number or a fewer number of channels 62 if so desired. The separation element can also include a lengthwise extending rib 64 that projects outwardly from the body of the separation element 60 for engaging a corresponding slot 66 defined by the branch portion 38 proximate the secondary output port 34, thereby securing the separation element within the branch portion 38.

To further protect the optical fibers 30 following their exit from the secondary output port 34, the channels 62 defined by the separation element 60 may also be designed to receive and engage end portions of corresponding transport tubes 68, albeit smaller transport tubes than the transport tube that could otherwise be engaged by the secondary output port 34 itself. In this regard, the channels 62 are preferably defined by the separation element 60 to taper inwardly from a larger diameter at the end of the separation element 60 proximate the secondary output port 34 to a smaller diameter at the end of the separation element 60 opposite the secondary output port 34. By sizing the diameter of each channel 62 at the end of the separation element 60 proximate the secondary output port 34 to be slightly larger than the diameter of the transport tube 68 and by sizing the diameter of each channel 62 at the end of the separation element 60 opposite the secondary output port 34 to be smaller than the diameter of the transport tube 68, the end portion of each transport tube 68 can be inserted into a respective channel 62 until it is snugly engaged by the sidewalls.

As such, the optical fibers 30 that extend through the branch portion 38 can be separated into channels and can then enter respective transport tubes 68. While the channels 62 defined by the separation element 60 may be completely internal to the separation element 60, the channels 62 defined by the separation element 60 of the illustrated embodiment open through the exterior surface of the separation element 60 to facilitate the insertion of optical fibers therein. As illustrated, the openings defined by the exterior surface of the separation element 60 to the respective channels 62 are relatively small to prevent the optical fibers from inadvertently slipping out of the channels 62. Even in instances such as the illustrated embodiment in which the channels 62 open through the exterior surface of the separation element 60, however, the channels 62 are effectively closed once the first and second halves 14, 16 of the splitter housing 12 are closed since the interior walls of the splitter housing 12 serve to cover the openings through the exterior surface of the separation element 60 to the respective channels 62.

Once the optical fibers have been appropriately routed through the splitter housing 12, the first and second halves 14, 16 can be closed as shown in FIG. 2. To facilitate the alignment of the first and second halves 14, 16, the lengthwise extending edges of one half may define a groove, while the lengthwise extending edges of the other half may include a lip for engaging the groove. To secure the first and second halves 14, 16 of the splitter housing 12 together, the splitter housing 12 may further include one or more latches 70 carried by one half of the splitter housing 12 and one or more posts or other projections 72 carried by the other half of the splitter housing 12 for engaging corresponding latches once the first and second halves 14, 16 of the splitter housing are closed. The apparatus 10 for splitting optical fibers may also further include other mechanisms for securing the first and second halves 14, 16 of the splitter housing 12 together. For example, the apparatus 10 may alternatively include one or more tie wraps or other fasteners 74 that encircle the splitter housing, in addition to or instead of the latching mechanism.

In this exemplary embodiment, the splitter housing 12 can also include means, such as the ring 76 carried by one half of the splitter housing 12, through which the tie wrap or other fastener 74 extends to prevent the tie wrap or other fastener 74 from being slidably removed from the splitter housing 12.

In a typical application, the optical fibers 30 exiting through the secondary output port 34 can then be spliced to corresponding optical fibers of a fiber optic drop cable, while the optical fibers 28 extending through the inline portion 36 are generally express fibers that extend uncut and unspliced through the splitter housing 12. However, the apparatus 10 and method for splitting optical fibers can be utilized in a wide variety of other applications. In addition, the splitter housing 12 can be mounted upon a wide variety of fiber optic cables other than the fiber optic feeder cable 26 depicted in FIGS. 1 and 2. For example, the splitter housing 12 can be mounted upon fiber optic cables that include a plurality of buffer tubes, some of which extend through the splitter housing 12.

As described above, the apparatus 10 and method for splitting optical fibers according to the present invention therefore permit optical fibers to be selectively separated in a manner that protects the optical fibers by preventing the optical fibers from being excessively bent or from otherwise being physically damaged. In addition, the apparatus 10 and method for splitting optical fibers according to the present invention can redirect the optical fibers without requiring all of the optical fibers to be cut, and in particular, the express fibers 28 can extend uninterrupted through the splitter housing 12 without being cut or spliced.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An apparatus for splitting optical fibers comprising:
a splitter housing extending lengthwise between opposed first and second ends, the splitter housing defining an input port, proximate the first end, for receiving a plurality of optical fibers and primary and secondary output ports, proximate the opposed second end, through which the plurality of optical fibers exit the splitter housing; arid
a separation element disposed within the splitter housing proximate the secondary output port, the separation element defining a plurality of channels therethrough, each channel defining a lateral cross-sectional area that increases in a direction toward the secondary output port;
wherein the splitter housing comprises first and second halves, each half of the splitter housing extending lengthwise between the opposed first and second ends, and defining at least a portion of the input port and at least one of the output ports;
wherein the first and second halves of the splitter housing are at least partially separable such that the splitter housing is capable of being mounted upon the plurality of optical fibers without having to cut all of the optical fibers.

2. An apparatus according to claim 1 wherein each half of the splitter housing defines at least a portion of both the primary output port and the secondary output port.

3. An apparatus according to claim 1 wherein the first and second halves comprise corresponding latches such that the first and second halves of the splitter housing can be secured together.

4. An apparatus according to claim 1 further comprising a plurality of transport tubes that are partially inserted into respective channels defined by the separation element.

5. An apparatus according to claim 1 further comprising an adapter element disposed within the splitter housing proximate the input port for facilitating mounting the splitter housing upon different types of fiber optic cables.

6. An apparatus according to claim 1 further comprising a fiber retainer within the splitter housing proximate the secondary output port for engaging at least some of the optical fibers that exit through the secondary output port to retain those optical fibers within the splitter housing while the first and second halves of the splitter housing are being closed.

7. An apparatus for splitting optical fibers comprising:
an inline portion defining an input port at one end for receiving a plurality of optical fibers and a primary output port at an opposed end through which at least one optical fiber exits, the input port and the primary output port being coaxial; and
a branch portion extending from the inline portion at one end to a secondary output port at an opposed end, the branch portion being in communication with the inline portion such that at least one optical fiber can be split from the plurality of optical fibers and routed through the branch portion, the branch portion defining an acute angle with respect to the inline portion proximate the primary output port; and
a separation element disposed within the splitter housing proximate the secondary output port, the separation element defining a plurality of channels therethrough, each channel defining a lateral cross-sectional area that increases in a direction toward the secondary output port.

8. An apparatus according to claim 7 wherein the inline portion and the branch portion extend in a lengthwise direction, and wherein the branch portion is smaller in lateral cross-sectional area than the inline portion.

9. An apparatus according to claim 7 wherein the branch portion comprises:
a first segment proximate the inline portion that extends outwardly from the inline portion and that defines the acute angle with respect to the inline portion proximate the primary output port; and
a second segment connected to the first segment and extending parallel to the inline portion.

10. An apparatus according to claim 7 wherein the branch portion defines an acute angle of between 20° and 40° with respect to the inline portion proximate the primary output port.

11. An apparatus according to claim 10 wherein the branch portion defines an acute angle of about 30° with respect to the inline portion proximate the primary output port.

12. An apparatus according to claim 7 further comprising a plurality of transport tubes that are partially inserted into respective channels defined by the separation clement.

13. An apparatus according to claim 7 further comprising an adapter element disposed within the splitter housing proximate the input port for facilitating mounting of the splitter housing upon different types of fiber optic cables.

14. A method for splitting a plurality of optical fibers comprising:
providing a splitter housing extending lengthwise between opposed first and second ends and defining an input port proximate the first end and defining primary and secondary output ports proximate the second end;
providing a separation element disposed within the splitter housing proximate the secondary output port, the separation element defining a plurality of channels therethrough, each channel defining a lateral cross[]sectional area that increases in a direction toward the secondary output port;
separating the splitter housing into first and second halves with each half of the splitter housing extending lengthwise between the opposed first and second ends;
routing a plurality of optical fibers through the separated splitter housing such that at least one optical fiber extends from the input port to the primary output port and such that at least one optical fiber extends from the input port to the secondary output port through one of the channels defined by the separation element; and
closing the first and second halves of the splitter housing to retain the plurality of optical fibers therein.

15. A method according to claim 14 wherein closing the first and second halves of the splitter housing comprises latching the first and second halves of the splitter housing together.

16. A method according to claim 14 wherein routing the plurality of optical fibers through the separated splitter housing further comprises directing the at least one optical fiber that extends from the input port to the secondary output port through a transport tube.

17. A method according to claim 14 further comprising disposing an adapter element within the splitter housing proximate the input port and securing at least a portion of a fiber optic cable that includes the plurality of optical fibers to the adapter element.

18. A method according to claim 14 wherein routing the plurality of optical fibers through the separated splitter housing comprises engaging at least some of the optical fibers that exit through the secondary output port to retain those optical fibers within the splitter housing while the first and second halves of the splitter housing are being closed.

* * * * *